(12) United States Patent
Lailly et al.

(10) Patent No.: US 7,092,823 B2
(45) Date of Patent: Aug. 15, 2006

(54) METHOD OF FORMING A MODEL REPRESENTATIVE OF THE DISTRIBUTION OF A PHYSICAL QUANTITY IN AN UNDERGROUND ZONE, FREE OF THE EFFECT OF CORRELATED NOISES CONTAINED IN EXPLORATION DATA

(75) Inventors: Patrick Lailly, Pau (FR); François Renard, Rueil Malmaison (FR); Laure Pelle, Rueil Malmaison (FR); Florence Delprat-Jannaud, Suresnes (FR)

(73) Assignee: Institut Francais Du Petrole, Cedex (FR)

( * ) Notice: Subject to any disclaimer, the term of this patent is extended or adjusted under 35 U.S.C. 154(b) by 396 days.

(21) Appl. No.: 10/630,690

(22) Filed: Jul. 31, 2003

(65) Prior Publication Data

US 2005/0075791 A1    Apr. 7, 2005

(30) Foreign Application Priority Data

Aug. 5, 2002  (FR) .................................. 02 09919

(51) Int. Cl.
*G01V 3/18* (2006.01)
(52) U.S. Cl. ............................................ 702/14; 703/5
(58) Field of Classification Search ................. 702/14, 702/16, 6; 250/455.11; 703/5, 10; 367/57, 367/73
See application file for complete search history.

(56) References Cited

U.S. PATENT DOCUMENTS

| | | | | |
|---|---|---|---|---|
| 4,809,239 A | * | 2/1989 | Esmersoy | 367/57 |
| 4,839,522 A | | 6/1989 | Bourgeois et al. | 250/455.11 |
| 6,016,461 A | * | 1/2000 | Thore | 702/6 |
| 6,131,071 A | * | 10/2000 | Partyka et al. | 702/16 |
| 6,263,284 B1 | * | 7/2001 | Crider et al. | 702/14 |

OTHER PUBLICATIONS

Mollison R. A. et al., Normalised QV Models, Mar. 20, 2002, Baker Hughes, Technical Paper References, All.*
Antoine Guitton et al., Robust Inversion Huber Norm, Oct. 11, 1990, Geophysics, vol. # 4 (Jul.-Aug.-2003), pp. 1310 to 1319.*
Qifa Ke et al., Robust Subspace Computation Using L1 Norm, CMU-CS-03-172, Dec. 2003, Charnegie Mellon University, School of Computer Science, pp. 1-15.*
Leif Azzopardi et al., Topic Based Language Models For ad hoc Information Retrieval, Dec. 2004, University of Paisley UK, School of ICT, pp. 1-5 unnumbered.*

* cited by examiner

*Primary Examiner*—John Barlow
*Assistant Examiner*—Victor J. Taylor
(74) *Attorney, Agent, or Firm*—Antonelli, Terry, Stout and Kraus, LLP.

(57) ABSTRACT

The invention is a method of estimating, from data obtained by exploration of a zone of a heterogeneous medium, a model representative of a distribution, in the zone, of at least one physical quantity, the model being free of a presence of correlated noises that may be contained in the data which has application to determining the distribution in an underground zone of acoustic impedance, propagation velocities and permeabilities, etc. The method includes acquiring measurements giving information about physical characteristics of the zone; specifying a noise modelling operator which associates, with a model of each physical quantity, synthetic data that constitute a response of the model; selecting a noise modelling operator which associates a correlated noise with a noise-generating function belonging to a predetermined space of the noise-generating functions; specifying a norm or of a semi-norm in the data space; specifying a semi-norm in the space of the noise-generating functions; defining a cost function; and adjusting the model and of the noise-generating functions.

37 Claims, 9 Drawing Sheets

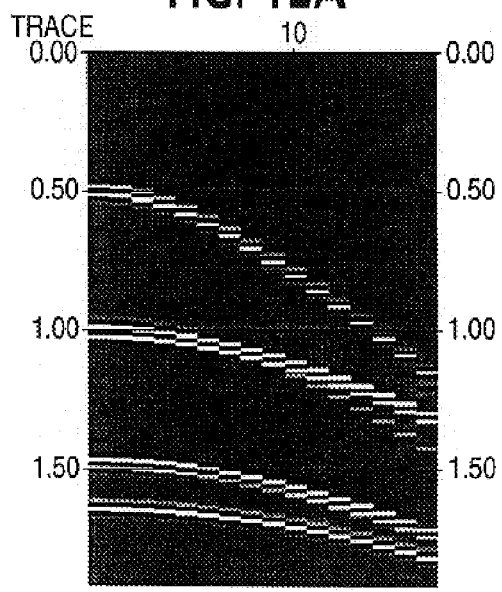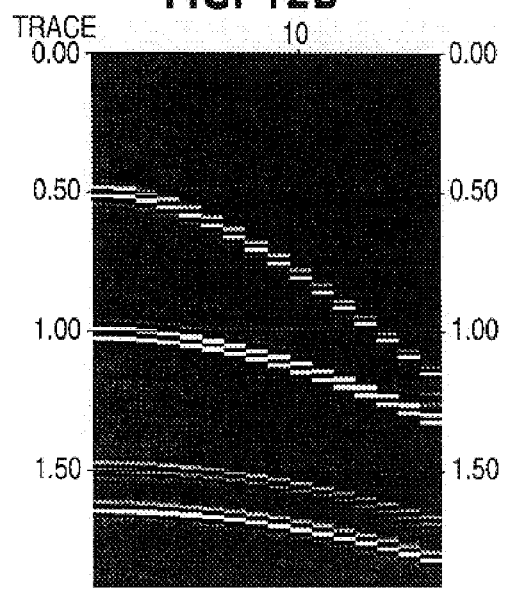

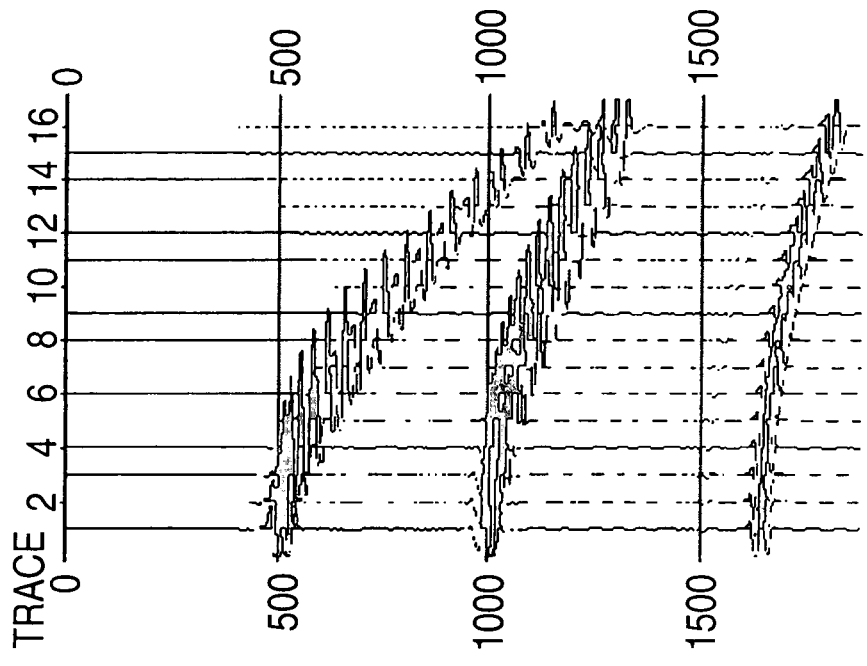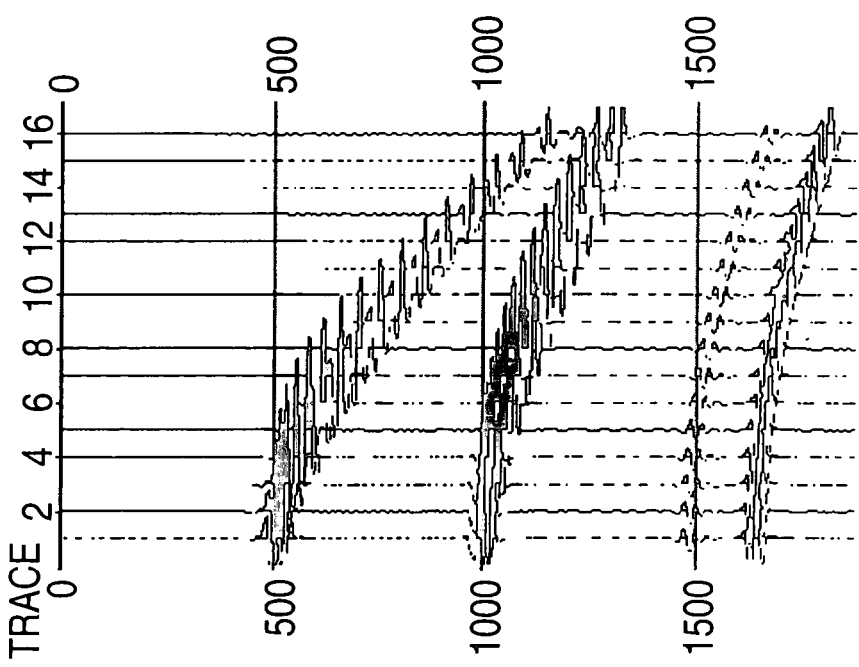

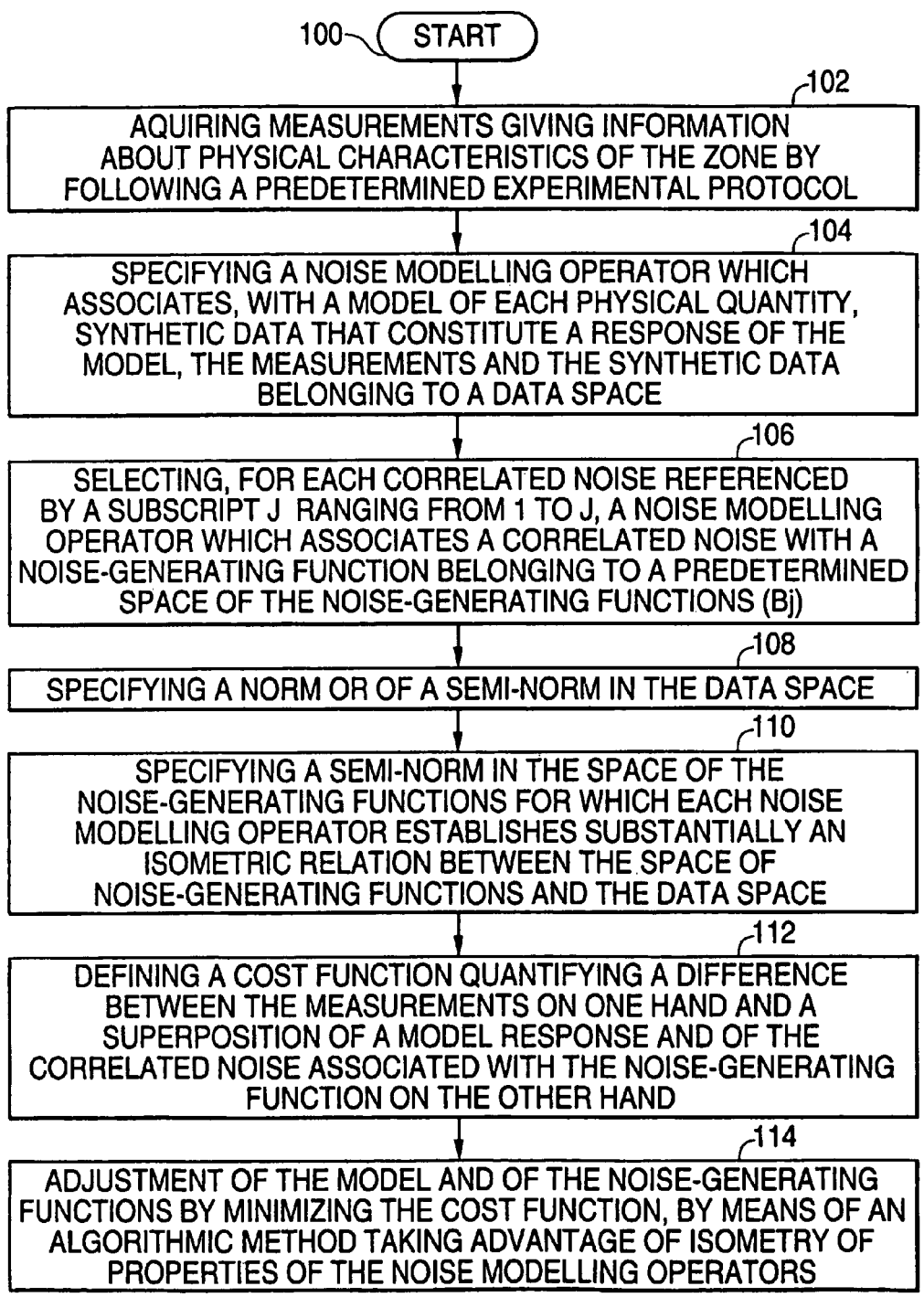

METHOD OF FORMING A MODEL REPRESENTATIVE OF THE DISTRIBUTION OF A PHYSICAL QUANTITY IN AN UNDERGROUND ZONE, FREE OF THE EFFECT OF CORRELATED NOISES CONTAINED IN EXPLORATION DATA

BACKGROUND OF THE INVENTION

1. Field of the Invention

The present invention relates to a method of forming, from data obtained by exploration of a zone of a heterogeneous medium, a model representative of the distribution in the zone of a physical quantity (at least partly) free of the presence of correlated noises that may be contained in the data.

The method applies, for example, to the quantification of the acoustic impedance in an underground zone.

2. Description of the Prior Art

The process of seeking a model that adjusts to experimental measurements has been developed in nearly all the fields of the sciences or technology. Such an approach is known under various names: least-squares method for parameters estimation, for inverse problem solution. For a good presentation of this approach within the context of geosciences, one may for example refer to:

Tarantola, A.: "Inverse Problem Theory: Method for Data Fitting and Model Parameter Estimation", Elsevier, Amsterdam, 1987.

It can be noted that the term "least squares" refers to the square of the norm in the data space for quantifying the difference between the response of a model (which is the image of the model by a previously selected modelling operator) and the data using, a cost function that has to be minimized to solve the problem. Using the square of the norm to define the cost function is just a practical convenience, and it is not fundamentally essential. Besides, many authors use, for various reasons, another definition of the cost function but this definition remains based on the use of the norm, or of a semi-norm, in the data space. Finally, considerable latitude exists for selecting the norm (or the semi-norm) in the data space (the use of the Euclidean norm is not required). In the case of noise-containing data, the solution can substantially depend on the choice made at this stage. More developments concerning this problem, are referred to in the following publications:

Tarantola, A.: "Inverse Problem Theory: Method for Data Fitting and Model Parameter Estimation", Elsevier, Amsterdam, 1987; Renard and Lailly, 2001; Scales and Gersztenkorn, 1988 ; Al-Chalabu, 1992.

The measuring results often contain errors. Modelling noises add further to these measuring errors when the experimentation is compared with modelling results: modellings are never perfect and therefore always correspond to a simplified view of reality. The noise will therefore be described hereafter as the superposition of:

non correlated components (white noise for example), correlated components, which means that the existence of a noise on a measuring sample translates into the existence of a noise of equal nature on certain neighbouring measuring points; modelling noises typically belong to this category.

When the data contain correlated noises, the quality of the model estimated by solving the inverse problem can be seriously affected thereby. As already mentioned, no modelling operator is perfect. It is therefore the work of the whole community of the people involved in the identification of parameters describing a model which is hindered by the existence of correlated noises. Among these people, seismic exploration practitioners are among the most concerned ones: in fact, their data have a poor or even very bad signal-to-noise ratio. This is the reason why correlated noise filtering techniques are an important part of seismic data processing softwares. The most conventional techniques use a transform (Fourier transform for example) where signal and noise are located in different areas of space, thus allowing separation of the signal from the noise. A general presentation of the conventional methods for noise elimination on seismic data is discussed in the book by Yilmaz:

Yilmaz, O. 1987: "Seismic Data Processing", Investigation in Geophysics No.2, Society of Exploration Geophysicists, Tulsa, 1987.

However, these techniques are not perfect: they presuppose that a transformation allowing complete separation of the signal and of the noise has been found. In this context, correlated noises are particularly bothersome because they can be difficult to separate from the signal (which is also correlated) and can have high amplitudes. It is therefore often difficult to manage the following compromise: either the signal is preserved, but a large noise residue remains, or the noise is eliminated, but then the signal is distorted. These filtering techniques can be implemented before solving the inverse problem: they constitute then a preprocessing applied to the data. The quality of the inverse problem solution then widely depends on the ability of the filters to eliminate the noise without distorting the signal.

This approach is introduced by Nemeth et al. in the following publication:

Nemeth T. et al. (1999), "Least-Square Migration of Incomplete Reflection Data", Geophysics, 64, 208–221 which constitutes an important advance for the inversion of data disturbed by high-amplitude correlated noises. The authors propose eliminating the noise by solving an inverse problem: after defining the space of the correlated noises as the image space of a vector space B (space of the noise-generating functions) by a linear operator T and the signal as the image space of a vector space M (models space) by a modelling operator F (assumed to be linear), they seek the signal in F(M) and the noise in T(B) whose sum is as close as possible (in the sense of the Euclidean norm or, on a continuous basis, of the norm $L^2$) to the measured datum. This technique constitutes an important advance insofar as it allows elimination (or at least very substantial reduction) of high-amplitude correlated noises (surface waves for example) that are difficult to separate from the signal by means of conventional filtering techniques. However, according to the authors, an increase by an order of magnitude of the computing time required for solution of the conventional inverse problem, that is without seeking the correlated component of the noise, is the price to pay for these performances. Furthermore, the result obtained with the method is extremely sensitive to any inaccuracy introduced upon definition of operator T: this is the ineluctable compensation for the high aptitude of the method to discriminate signal and noise.

SUMMARY OF THE INVENTION

The method according to the invention allows to estimate, from data obtained by exploration of an underground zone, a model representative of the distribution, in the zone, of at least one physical quantity, this model being substantially free of the presence of correlated noises that may be contained in the data. The method essentially comprises the following stages:

a) acquisition of measurements giving information about certain physical characteristics of the zone by following a predetermined experimental protocol, b) specification of a modelling operator which associates, with a model of each physical quantity, synthetic data that constitute the response of the model, the measurements and the synthetic data belonging to a data space, c) for each correlated noise referenced by a subscript j ranging from 1 to J, selection of a modelling operator which associates a correlated noise with a noise-generating function belonging to a predetermined space of noise-generating functions, d) specification of a norm or of a semi-norm in the data space, e) specification of a semi-norm in the space of the noise-generating functions for which each noise modelling operator establishes substantially an isometric relation between the space of the noise-generating functions space and the data space, f) definition of a cost function quantifying the difference between the measurements on the one hand and the superposition of the model response and of the correlated noises associated with the noise-generating functions on the other hand, and g) adjustment of the model and of the noise-generating functions by minimizing the cost function, by means of an algorithmic method taking advantage of the isometry properties of the noise modelling operators.

According to a first implementation mode, the distribution as a function of the depth of the acoustic impedance in the medium is sought, the correlated noises affecting the data are tube waves identified each by parameters characterizing their propagation, the measured data are VSP type data obtained by means of pickups suited to detect the displacement of particles in the medium in response to a localized seismic excitation, the location of the pickups, the recording time and the time sampling points being defined, and the modelling operator selected associates the synthetic data with an acoustic impedance distribution as a function of the evaluated depth in traveltime and with the vertical stress measured as a function of time at the depth of the first pickup.

The cost function selected to quantify the difference between the measurements on the one hand and the superposition of the model response and of the correlated noises associated with the noise-generating functions on the other hand is for example the square of the semi-norm of this difference in the data space.

According to an embodiment, adjustment of the model and of the noise-generating functions is for example obtained by means of a relaxation method for eliminating the unknowns corresponding to each correlated noise generating function, this relaxation method being implemented within the iterations of a quasi-Newtonian algorithm for calculation of the model.

According to an embodiment, numerical calculation of the image of a model by this operator is carried out for example by numerical solution of the 1D waves equation for the model considered, by selecting values taken by the displacement of the particles at the locations of pickups and at the previously defined time sampling points, and by applying an operator likely to compensate for the spherical divergence and attenuation effects.

According to an embodiment, the numerical noise modelling operator is a finite-difference centered numerical scheme for discretizing the noise transport equation, and the noise-generating function involved as the initial condition along the edge of the zone associates with each correlated noise a space of noise-generating functions comprising support time functions in a given time interval.

Various examples of norms or semi-norms selected for the data space and the space of the noise-generating functions are given in the detailed description hereunder.

According to a second implementation mode, the distribution of disturbances, in relation to a previously selected reference medium, of the impedance and of the velocity in the zone of the medium is sought, the correlated noises affecting the data are due to multiple reflections whose kinematics and amplitude variations with the offset have been previously estimated, the measured data are picked up by seismic surface pickups, the location of the pickups, the seismic excitation mode, the recording time and the time sampling points being defined, and the modelling operator being defined via a linearization of the waves equation around the reference medium.

The cost function selected to quantify the difference between the measurements on the one hand and the superposition of the model response and of the correlated noises associated with the noise-generating functions on the other hand is for example the square of the semi-norm of this difference in the data space.

According to an embodiment, adjustment of the model and of the noise-generating functions is obtained by means of a block relaxation method for eliminating the unknowns corresponding to each correlated noise generating function, this relaxation method being implemented within the iterations of a conjugate gradient algorithm for calculation of the model.

BRIEF DESCRIPTION OF THE DRAWINGS

Other features and advantages of the method according to the invention will be clear from reading the description hereafter of an embodiment given by way of non limitative example, with reference to the accompanying drawings wherein:

FIG. 15 is a block diagram of a method of estimating, for data obtained by exploration of a zone of a heterogeneous medium, a model representative of a distribution, in the zone, of at least one physical quantity, the model being free of a presence of correlated noises that may be contained in the data.

DETAILED DESCRIPTION OF THE PREFERRED EMBODIMENTS

Formulation of the Problem

Figure 1:
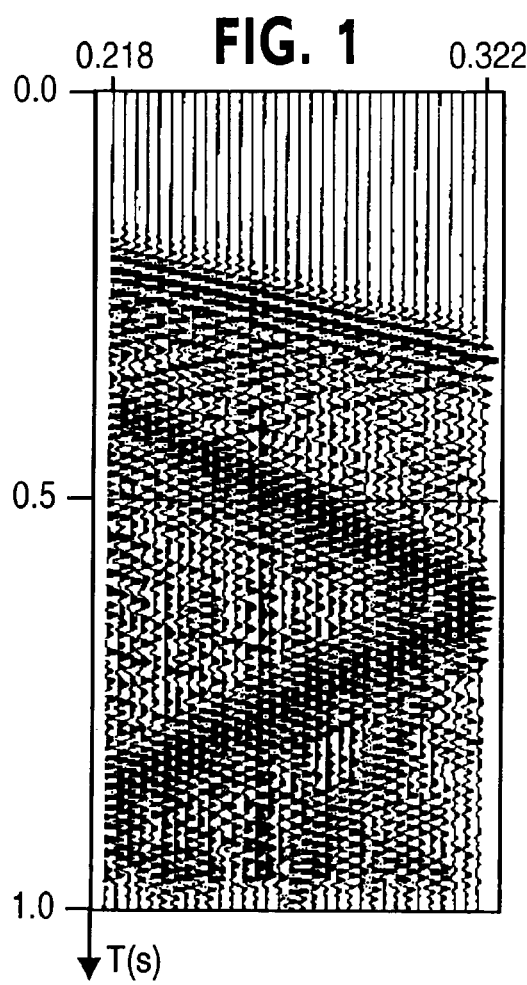
FIG. 1 shows an example of data obtained by means of a vertical seismic prospecting method (VSP)

Data is available resulting from a sampled measurement of a function. This function depends on several variables (space or space-time variables for example).

These data, called d, correspond to measurements carried out to obtain information about a model m. They contain various noises:

correlated noises (or a superposition of correlated noises), non correlated noises.

The problem is to determine quantitatively model m (or functions of this model) from data d.

A modelling operator F is selected (linear or not) which associates with model m the response of the model. This operator actually models the real physical phenomenon only imperfectly. This is essentially (but not exclusively) the reason why correlated noises appear in the data: these noises correspond to a signal related to the model but the relation between them appears to be too complex to be included in modelling operator F, which should keep relatively simple for various reasons.

Under such conditions, the noise is modeled by introducing one or more noise-generating spaces $B_j$ (j ranging from 1 to J) and the associated noise modelling operators called $T_j$. In order to find model m from data d, seeking this model is proposed as the solution to the optimization problem.

$$\min_{(m,\beta_1,\beta_2,\ldots\beta_J) \in M \times \prod_{j=1}^{J} B_j} C(m, \beta_1, \beta_2, \ldots \beta_J) = \left\| F(m) + \sum_{j=1}^{J} T_j \beta_j - d \right\|_D^2 \quad (1)$$

where $\| \: \|_D$ is a norm (or possibly a semi-norm) in the data space.

The above relationship differs from the approach proposed by Nemeth et al. (1999) in that:

modelling operator F is not necessarily linear, considering a superposition of correlated noises of different types is justified (in the sense that they are modelled by different operators referenced by subscripts j), at the price of a marked increase in the number of calculations concerning the number of unknowns (which particularly complicates the solution of the optimization problem) as well as the number of noise modellings to be carried out, the possibility of selecting norm $\| \: \|_D$ or possibly the semi-norm to suit our convenience in the data space is reserved.

The choice that is made for $\| \: \|_D$ will be imposed by considerations linked with the efficiency of the solution method (described below), this efficiency allowing dealing with the case of a correlated noise superposition. This is an important opening: besides the possibility of processing data containing correlated noises with complex characteristics, in this way the difficulties are overcome which are encountered in Nemeth et al.'s approach, linked with the high sensitivity of the result to an inaccuracy introduced upon definition of the noise modelling operator. To overcome this difficulty, the noise is sought by superposition of noises associated with approximate modelling operators $T_j$.

It can be noted that selection of the square of norm $\| \: \|_D$ involved in the optimization problem is not essential: the solution is not changed by selecting instead a function which, like the square function, is an increasing function on $\Re^+$ (or a decreasing function provided that the min is changed into the max).

The Solution Method

The method suitably selects:

norm (or semi-norm) $\| \: \|_D$ in the data space, norms $\| \: \|_D$ in each space $B_j$ so as to obtain a high-performance algorithmic solution to optimization problem (1). The expression "suitably select" means see that each operator $T_j$ constitutes an isometry (or an isometry approximation) for norms $\| \: \|_j$ and $\| \: \|_D$ respectively in the initial space and in the end space. The main idea in the determination of norms, allows making each operator $T_j$ to be isometric, is based on the existence of energy conservation type equalities verified by the solutions to the partial differential equations (or of discrete energy equalities for the solutions to certain numerical schemes used for discretization of these equations).

If such choices are made, it is possible to make the cost function minimization very simple by eliminating the unknowns associated with the correlated noise generating functions (determination of Schur's complement). This elimination is peformed by means of a suitable algorithm such as the block relaxation method, a block being associated with a noise-generating function, or the conjugate gradient method with symmetrical-block Gauss-Seidel preconditioning, etc., all of them algorithmic implementation methods well-known in the art, presented for example by:

Golub, G. H. et al. (1983) "Résolution Numérique des Grands Systéms Linéaires" (Eyrolles).

Simplified minimization of the cost function allows considerable reduction of the time required for numerical solution.

First Implementation Example Applied to 1D Inversion of VSP Data Contaminated by a Tube Wave VSP (Vertical Seismic Profile) data belong to conventional well survey acquisitions. VSP data have multiple applications, one of the main ones being their use for establishing a connection between seismic surface data and logging measurements. The inversion of VSP data as described for example by Macé, D. and Lailly, P. (1984) A Solution of an Inverse Problem with 1D Wave Equation Applied to the Inversion of Vertical Seismic Profile; Proc. of the 6$^{th}$ Intern. Conf. In "Analysis and Optimisation of Systems", Nice, 2, 309–323 has been developed to that end. In the 1D inverse problem, the subsurface model is assumed to be laterally invariant and that a plane-wave excitation propagates vertically. The unknowns of the problem are the acoustic impedance distribution as a function of depth (measured in vertical traveltime and over an interval starting at the depth of the first receiver) and the seismic excitation mode (precisely the time function characterizing the boundary condition at the depth of the first pickup). This is a non linear inverse problem, the VSP data depending non linearly on the impedance distribution.

VSP data are often contaminated by a correlated noise of very high amplitudefrom a fluid wave. This wave is guided in the mud that invades the well. Its propagation velocity is low in relation to the propagation velocity in the rocks surrounding the well. Furthermore, the propagation velocity of the fluid wave depends on the frequency (dispersive propagation). Finally, the fluid wave reflects notably at the well bottom and furthermore gives rise to another propagation mode. Typical VSP data are given in the figure below: the main characteristics of the tube wave can be seen. Its amplitude and the extension of the contaminated zone make it difficult to use the signal contained in the many seismic samples contaminated by the fluid wave.

Hereafter the implementation of the method for 1D inversion of VSP data is described.

Experimental Protocol

It specifies:

the various depths at which the receivers are positioned in the well (assumed to be vertical): in experiments, the pickups cover the range of depths measured in one-way time [$x_{min}$=0.05 s; $x_{max}$=0.2 s], with a receiver every $\Delta x$=1 ms (in one-way time); thus samples numbered from 0 to 1 are obtained, the physical nature of the measurement performed by the pickups: in experiments, the pickups measure the vertical displacement resulting from the wave propagation, the recording time: in experiments, the pickups measure the vibrational state over the time interval [0, T=1.5 s], these data being sampled every $\Delta t$=1 ms. Thus samples numbered from 0 to N are obtained.

The data $d_i^n$ is the data sample recorded at the depth $x_{min}$+i $\Delta x$ and at the time n $\Delta t$. Of course: T=N $\Delta t$ and $x_{max}$=$x_{min}$+I $\Delta x$.

Acquisition of Data in Accordance with the Experimental Protocol

Figure 2:
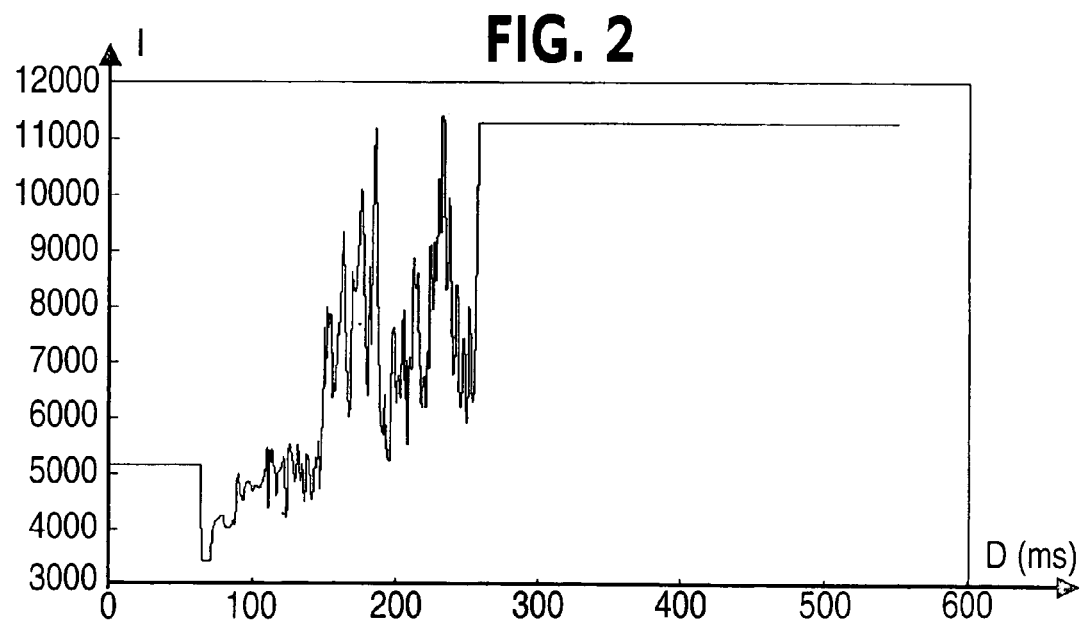
FIG. 2 shows a model of distribution of the acoustic impedance with depth.

Experiments were carried out from synthetic data, that is obtained by numerical modelling, itself carried out in two stages:

Creation of synthetic data containing no noise: this creation was performed by numerical solution of the 1D acoustic wave equation, the model being the acoustic impedance distribution shown in FIG. 2 (the depth is measured in one-way time) and the excitation mode (Neumann's boundary condition at the depth 0) being a conventional Ricker wavelet.

Figure 3:
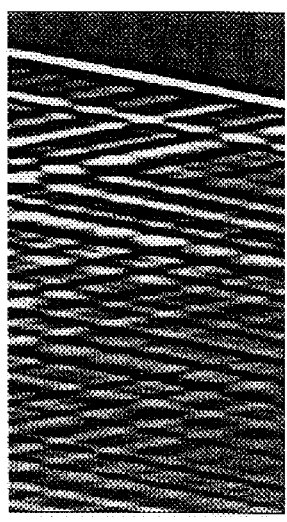
FIG. 3 shows synthetic VSP data obtained on the basis of the impedance model of FIG. 2.

The synthetic VSP data resulting from this modelling are shown in FIG. 3: the vertical axis representing the observation time is graduated from 0 to 1.5 s and the horizontal axis representing the depth (in one-way traveltime) of the various pickups is graduated from 0.05 to 0.2 s.

Addition of Noise to the Data

Figure 4:
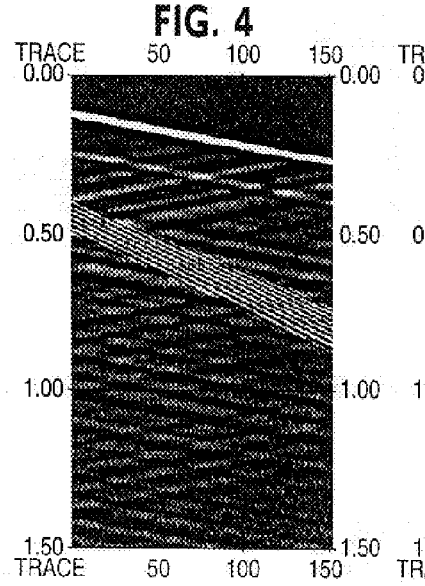
FIG. 4 shows an example of VSP data contaminated by a single correlated noise.
Figure 5:
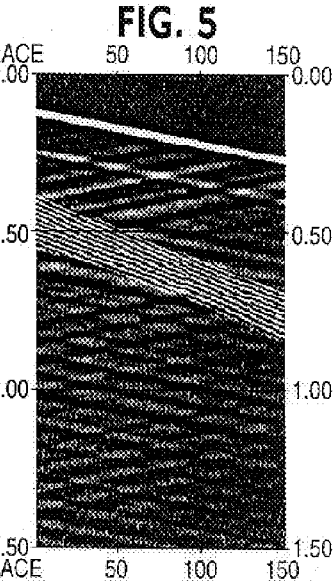
FIG. 5 shows an example of VSP data contaminated by two correlated noises.

The VSP data are disturbed thus calculated by adding thereto, on the one hand, a random noise (but filtered in the seismic frequency band) of rather high amplitude and, on the other hand, one or more correlated noises of very high amplitude. Each noise will propagate downwards with a low velocity which depends on the frequency (dispersive propagation): these correlated noises are supposed to represent fluid waves. They have been modelled by numerical solution (use of the finite-difference centered scheme) of a transport equation with a constant propagation velocity. Dispersion of the waves has been obtained using large discretization intervals in the finite-difference scheme. In the case of the superposition of several correlated noises, the propagation velocities associated with each noise are different. FIGS. 4 and 5 show the VSP data contaminated by a single correlated noise (FIG. 4) and by the superposition of two correlated noises (FIG. 5).

Specification of the Modelling Operator

Modelling is carried out by solving the wave equation:

$$\sigma(x)\frac{\partial^2 y}{\partial t^2} - \frac{\partial}{\partial x}\left(\sigma(x)\frac{\partial y}{\partial x}\right) = 0 \text{ in} ]x_{min}, +\infty[ \times [0, T]$$

with Neumann's boundary condition:

$$-\sigma(x_{min})\frac{\partial y}{\partial x}(x_{min}, t) = h(t) \text{ on } [0, T]$$

and the initial conditions:

$$y(x, 0) = \frac{\partial y}{\partial t}(x, 0) = 0 \text{ on } [x_{min}, +\infty]$$

Definition of the modelling operator first requires definition of the observation operator which formalizes the experimental protocol described in §1. The observation operator thus is the operator which associates with function y(x,t), solution to the above system, samples $y(x_i,t^n)$ for $x_i$=$x_{min}$+i $\Delta x$ and $t^n$=n $\Delta t$, i=0, . . . , I; n=0, . . . , N.

The modelling operator identified as F(m) thus is the (non linear) operator which associates with function pair m=($\sigma$(x),h(t)) samples $y(x_i,t^n)$ for $x_i$=$x_{min}$+i $\Delta x$ and $t^n$=n $\Delta t$, i=0, . . . , I; n=0, . . . , N.

Specification of the Modelling Operator Associated with each Correlated Noise

The procedure is specified herein that can be used for modelling each correlated noise. Each correlated noise will be characterized by correlation directions specific thereto, which are assumed to be known, at least approximately: these correlation directions are specified by means of a field of correlation vectors $\vec{c}_j(x,t)$ of components ($c_j^x(x,t)$, $c_j^t(x,t)$) which has to be defined at any point of the domain [$x_{min}$, $x_{max}$]×[0,T]. In an equivalent way, the correlation directions can be specified by means of correlation lines that will represent the field lines associated with $\vec{c}_j(x,t)$. Such correlation lines can be obtained according to the technique described in U.S. Pat. No. 4,972,383 filed by the applicant, from a pick of several phases characteristic of the noise, the information being extended to the whole domain [$x_{min}$, $x_{max}$]×[0,T] by means of conventional interpolation and/or extrapolation procedures. Specification of the correlation directions amounts to specifying the propagation velocity distribution of the noise $c_j(x,t)$ that is related to the correlation vector by the relation $c_j(x,t)=c_j^x(x,t)/c_j^t(x,t)$. Here it is assumed that there are no wave amplitude variations during propagation of the wave (a different situation is presented for the 2$^{nd}$ application example). Modelling of a correlated noise as specified above is based on the following observation: a wave propagating along correlation lines without amplitude change is solution to the transport equation:

$$\vec{\nabla} b(x,t) \cdot \vec{c}(x,t) = 0$$

In this context, introduced are:

a space $B_j$ of noise-generating functions which will be the space of support functions $\beta_j(t)$ in $[t_j^{min}, t_j^{max}] \subset [0,T]$ and that is extended by 0 in the whole interval $[0,T]$, noise modelling operator $T_j$:

$$T_j: \beta_j(t) \epsilon B_j \to b_j(x,t) \epsilon D$$

solution to the transport equation $$\vec{\nabla} b_j(x,t) \cdot \vec{c}_j(x,t) = 0 \text{ in } [x_{min}, x_{max}] \times [0,T]$$

and meeting the initial conditions:

$$\begin{cases} b_j(x, t=0) = 0 \\ b(x = x_{\min}, t) = \beta_j(t) \end{cases}$$

It can be noted that the geometry of the correlation lines (or, which amounts to the same thing, the propagation velocity distribution) cannot be any geometry: the correlation lines cannot intersect, or the transport equation solution problem would not be correctly set. For the same reasons, the correlation lines cannot intercept twice the edges on which the initial conditions are specified. The latter consideration can lead (in order to model a correlated noise corresponding to an upgoing wave) to specify the initial condition no longer at $x=x_{min}$ but at $x=x_{max}$ or even at an intermediate value, even if it means decomposing Cauchy's problem into two problems associated with the domains located on either side of this intermediate edge.

It is furthermore assumed that the geometry of the correlation lines is such that (more general situations can be considered, but the following results then take a different form):

$$c_j(x, t) = \xi_j(x) \times \tau(t)$$

on encore: $c_j^x(x, t) = \xi_j(x)$ et $c_j^t(x, t) = \frac{1}{\tau(t)}$

Finally, it is assumed that the pencil of correlation lines that intercept at $x=x_{min}$ interval $[t_j^{min}, t_j^{max}]$ do not intercept at $t=T$ interval $[x_{min}, x_{max}]$.

In fact, the transport equation is solved by means of a numerical scheme. It is for example possible to use the conventional finite-difference centered scheme. Therefore discretization intervals $\Delta x_j'$ and $\Delta t_j'$ are selected (which are not necessarily equal to $\Delta x$ and $\Delta t$, but which are assumed to be submultiples of these quantities, even if more general situations can be considered) and a grid is introduced whose nodes are the points of coordinates $(x_{min}+i'\Delta x_j', n'\Delta t_j')$ with i' and n'$\in$N. The conventional finite-difference centered scheme explained hereunder allows, from the initial conditions, to calculate step by step the different values taken by function $b_j(x,t)$ at the various nodes of the grid (to simplify the notations, subscript j associated with the correlated noise considered is omitted).

$$\frac{\xi_{i'} + \frac{1}{2}}{2\Delta t'}\left[b_{i'+1}^{n'+1} + b_{i'}^{n'+1} - b_{i'+1}^{n'} - b_{i'}^{n'}\right] +$$

$$\frac{1}{2\Delta x' \tau^{n'+\frac{1}{2}}}\left[b_{i'+1}^{n'+1} + b_{i'+1}^{n'} - b_{i'}^{n'+1} - b_{i'}^{n'}\right] = 0$$

In the above formula, quantity $\alpha_{i'}^{n'}$ represents the evaluation of quantity $\alpha$ ($\alpha$ is a generic term) at the point of coordinates $(x_{min}+i'\Delta x_j', n'\Delta t_j')$.

Of course, the use of discretization intervals $\Delta x_j'$ and $\Delta t_j'$ sufficiently small in relation to the wavelength is required if the numerical scheme is to give a precise approximation of the function solution to the transport equation.

However, the use of larger discretization intervals (but still smaller than the wavelength) allows modelling more complex propagation phenomena by making the wave propagation velocity dependent on the frequency: dispersive propagations such as the propagation of tube waves can thus be modelled. Selection of suitable discretization intervals for modelling a particular mode of the tube wave can be made:

By determining, after examining the data, the propagation velocity of this mode (which depends here not only on space and time, but also on the frequency); tomography techniques can be used to that end, such as those presented in the following publication:

Ernst, F. et al. (2000); Tomography of Dispersive Media; J. Acoustic Soc. Am., 108, 105–116.

By knowing the dispersive propagation properties associated with the numerical scheme, properties that follow from an analysis of the numerical dispersion relation, as described for example in the following publication:

Alford, R. M. et al. (1974), Accuracy of Finite Difference Modeling of the Acoustic Wave Equation; Geophysics, 6, 834–842.

Specification of a Norm or of a Semi-Norm in the Data Space

A first choice takes as the norm in the data space any discrete norm which is meant to be an approximation (via a quadrature formula) to the norm defined on a continuous basis by:

$$\|u\|_D = \left(\int_{x_{\min}}^{x_{\max}} dx \int_0^T dt \frac{1}{\tau(t)} u^2(x,t)\right)^{\frac{1}{2}}$$

The semi-norm, which is a better choice as discussed in the next paragraph may also be used:

$$\|u\|_D = \left(\Delta x \Delta t \sum_{i=0}^{I-1} \sum_{n=0}^{N-1} \frac{1}{\tau^{n+\frac{1}{2}}} (u_i^{n+1} + u_i^n)^2\right)^{\frac{1}{2}}$$

where u is any vector of the data space (i and n are the indices representing the sample numbers respectively in space and in time).

Besides, other choices are also possible.

Specification, in each Space $B_j$ of Noise-Generating Functions, of a Norm for which each Noise Modelling Operator $T_j$ Establishes an Isometric Relation (or the Approximation of an Isometric Relation) between the Noise-Generating Functions Space and the Data Space (Provided with the Semi-Norm as Defined in §5)

The procedure herein specifies defining the norm in the noise-generating functions space associated with each correlated noise. This procedure being the same for each noise, the description is generic and leaves out, in the formulas, subscript j associated with the noise considered.

A first choice provides space of each noise-generating functions B with any discrete norm meant to be an approximation (via a quadrature formula) to the norm defined on a continuous basis by:

$$\|\beta\|_B = \left(X \int_0^T dt \frac{1}{\tau(t)} \beta^2(t)\right)^{\frac{1}{2}}$$

in which case, using the fact that, by means of the hypotheses set out in §4, $b_j(x,T)=0$ for $x \in [x_{min}, x_{max}]$, linear operator $T_j$ performs an isometry between $B_j$ and $D$. However, since calculation of $T_j\beta_j$ is carried out numerically, the isometric character of operator T will not be perfect but only approximate, the approximation being all the better as discretization intervals $\Delta x$, $\Delta t$, $\Delta x_j'$, $\Delta t_j'$ are small. The fact that only approximately an isometry is available leads to lower performances concerning the algorithmic implementation presented hereafter.

A better choice provides each noise-generating functional space $B_j$ with the semi-norm:

$$\|\beta\|_B = \left(\Delta x \Delta t \, I \sum_{n=0}^{N-1} \frac{1}{\tau^{n+\frac{1}{2}}} (\beta^{n+1} + \beta^n)^2 \right)^{\frac{1}{2}}$$

In this case, operator $T_j$ rigorously performs an isometry between $B_j$ and $D$, $$I \sum_{n=0}^{N-1} \frac{1}{\tau^{n+1/2}} [u_0^{n+1} + u_0^n)^2] = \sum_{i=0}^{I-1} \sum_{n=0}^{N-1} \frac{1}{\tau^{n+1/2}} [(u_i^{n+1} + u_i^n)^2] + \sum_{i=0}^{I-1} \sum_{k=0}^{i} \frac{\Delta x \xi_{k+1/2}}{\Delta t} [(u_{k+1}^N + u_k^N)^2] - \frac{I \Delta x (u_0^N)^2 \xi_{-1/2}}{\Delta t}$$

at least if $u_i^N = 0 \, \forall i=0, I-1$. This results from the discrete energy equality:

an equality valid in the case (simplified for presentation's sake) where $\Delta x' = \Delta x$ and $\Delta t' = \Delta t$ and if $\xi_{-1/2} = \xi_{1/2}$ has been defined.

Definition of the Cost Function

The cost function is defined by the formula as follows:

$$C(m, \beta_1, \beta_2, \ldots, \beta_J) = \left\|F(m) + \sum_{j=1}^{J} T_j \beta_j - d\right\|_D^2$$

Seeking the Model and the Noise-Generating Functions Minimizing the Cost Function, this Search Being Carried out by an Algorithmic Method Taking Advantage, Explicitly or Implicitly, of the Isometry Properties of the Noise Modelling Operators (see 6)

The algorithmic method uses the specificity of Schur's complement, a specificity associated with the isometric character of operators $T_j$. This can be done for example by realizing that minimizing $C(m, \beta_1, \beta_2, \ldots, \beta_J)$ amounts to minimizing $C'(m) = C(m, \tilde{\beta}_1(m), \tilde{\beta}_2(m), \ldots \tilde{\beta}_J(m))$ where $(\tilde{\beta}_1(m), \tilde{\beta}_2(m), \ldots \tilde{\beta}_J(m))$ minimizes $C(m, \beta_1, \beta_2, \ldots, \beta_J)$ for given m. It can be noted that the Hessian associated with this quadratic form is Schur's complement. C'(m) can be minimized by means of any optimization method such as the BFGS version of a quasi-Newtonian method.

Determination of $(\tilde{\beta}_1(m), \tilde{\beta}_2(m), \ldots \tilde{\beta}_J(m))$ is very easy as a result of the isometric character of operators $T_j$, notably if choices (2) and (3) have been respectively selected to define $\|\,\|_D$ and $\|\,\|_{B_j}$. If there is only one type of noise (J=1) and if the isometry is perfect, determination of $\tilde{\beta}_1(m)$ simply requires evaluation of the gradient of the quadratic form. If there is a superposition of several noises (J>1), various algorithms can be considered to take advantage of the isometric character of operators $T_j$. $(\tilde{\beta}_1(m), \tilde{\beta}_2(m), \ldots \tilde{\beta}_J(m))$ can for example be determined by means of a block relaxation method (Gauss-Seidel alias), a block being associated with a group of unknowns $\tilde{\beta}_j(m)$, a relaxation iteration simply requiring (still in the case of a perfect isometry) a single evaluation of the gradient of the quadratic form associated with the block considered. For problems made difficult by the proximity of the correlation directions of the various noise types, a preconditioned conjugate gradient method can be considered, the preconditioning matrix being of symmetrical block (relaxation alias) Gauss-Seidel type. Then again, preconditioning is very easily implemented and solution of the problem associated with a block only requiring evaluation of the gradient of the quadratic form associated with the block considered.

FIGS. 6 to 11 show the results obtained with three types of experiments using the method.

Figure 6:
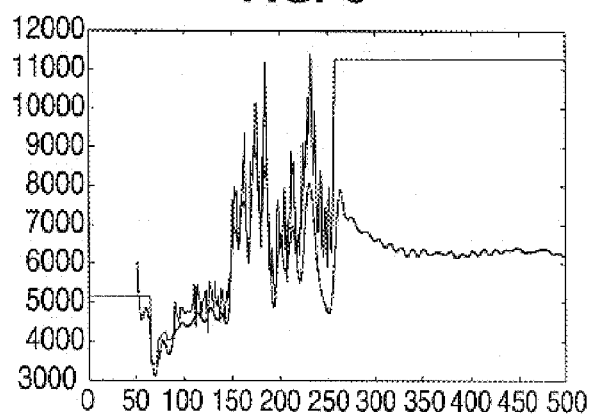
FIG. 6 shows the impedance distribution as a function of depth, obtained by inversion of the noise-containing data of FIG. 4.
Figure 7:
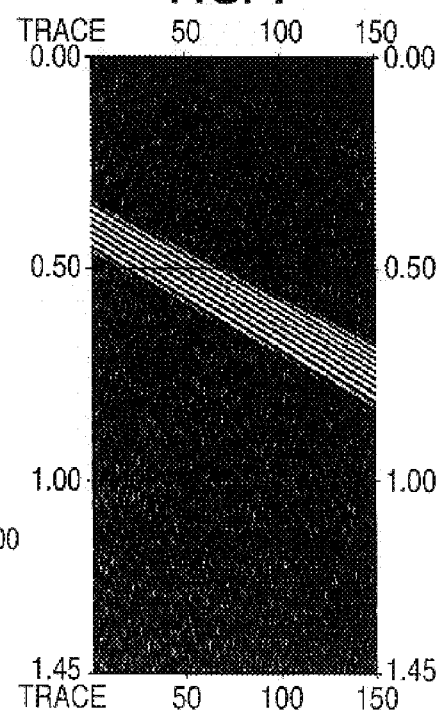
FIG. 7 shows the inversion residues (differences between the data of FIG. 4 and the seismic response of the model of FIG. 6)

In the case of an inversion of noise-containing data (FIG. 4) both by superposition of a correlated noise and of a random noise, FIG. 6 gives the impedance distribution obtained, and FIG. 7 shows the inversion residues.

Figure 8:
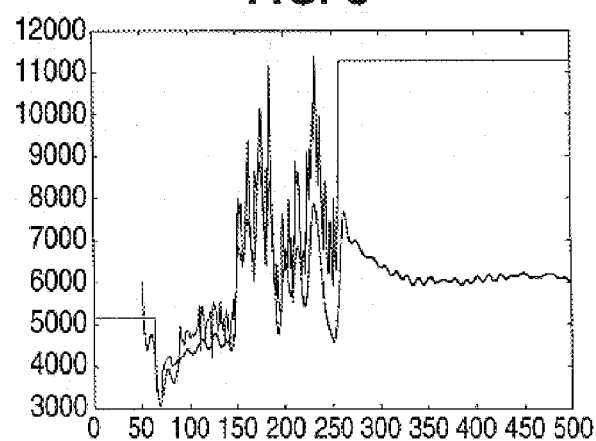
FIG. 8 shows the impedance distribution as a function of depth, obtained by inversion of the noise-containing data of FIG. 5.
Figure 9:
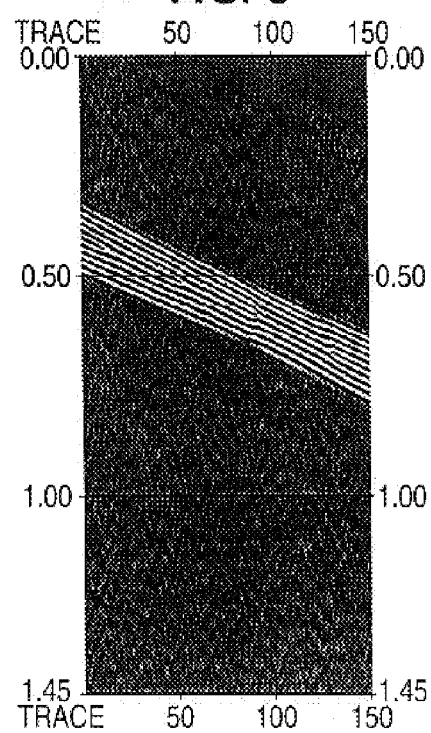
FIG. 9 shows the corresponding inversion residues (differences between the data of FIG. 5 and the seismic response of the model of FIG. 8)

In the case of an inversion of noise-containing data (FIG. 5) both by superposition of two correlated noises and of a random noise, FIG. 8 gives the impedance distribution obtained, and FIG. 9 shows the inversion residues.

Figure 10:
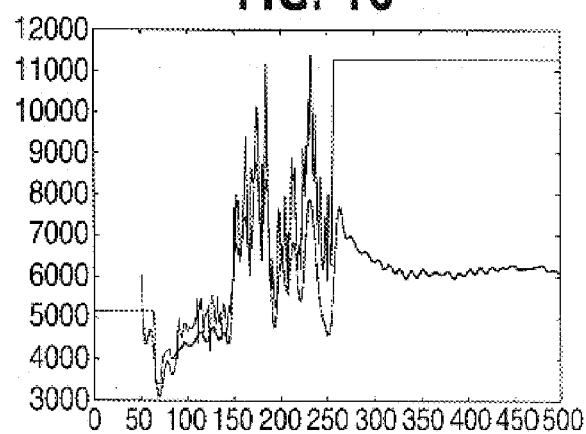
FIG. 10 shows the impedance distribution as a function of depth, obtained by inversion of the noise-containing data of FIG. 4 by seeking the correlated noise in a form of the superposition of two correlated noises having inaccurate propagation properties, that is different from those of the noise appearing in the data of FIG. 4.
Figure 11:
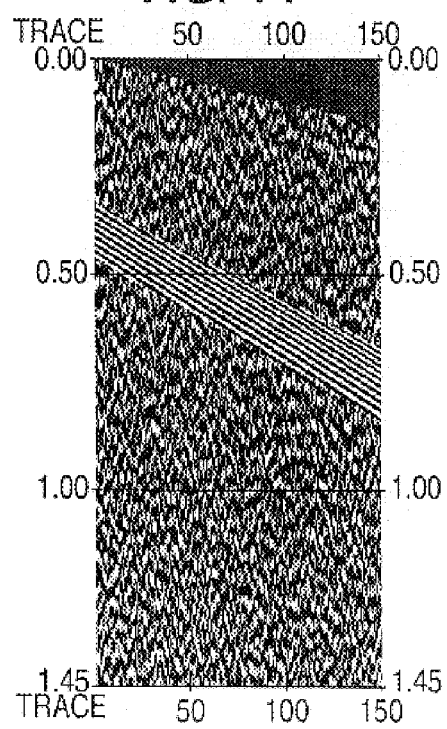
FIG. 11 shows the corresponding inversion residues (differences between the data of FIG. 4 and the seismic response of the model of FIG. 10), FIGS. 12A and 12B respectively show seismic data with multiple reflections and the seismic response of the model obtained after conventional linearized inversion, FIGS. 13A and 13B respectively show an example of impedance distribution and of propagation velocity for which the seismic data of FIG. 12A constitute the seismic response, FIGS. 14A and 14B respectively show the comparison of the seismic responses of the models obtained by conventional inversion (FIG. 14A) and by inversion according to the proposed method involving picking of the moveout of the multiple and an estimation of the amplitude variations with the offset (FIG. 14B)

In the case of an inversion of noise-containing data (FIG. 4) both by superposition of a correlated noise and of a random noise where the propagation properties of the fluid wave are not precisely known, it is natural to seek a correlated noise model which superposes two correlated noises having inaccurate propagation velocities but by which the true propagation velocity of the fluid wave is framed. FIG. 10 gives the impedance distribution obtained and FIG. 11 shows the inversion residues.

Second Example of Application of the Method to Determination of a Model by Linearized Inversion of Multi-Offset Data Contaminated by Multiple Reflections This application differs from the first one mainly in that it illustrates the possibilities afforded by the method for taking into account noise amplitude variations along the correlation directions. Another difference lies in the propagation properties of the correlated noises, propagation of the multiple reflections being not dispersive.

Linearized inversion is one of the sophisticated methods used by geophysicists to obtain a quantitative model of subsurface heterogeneities, this type of information being important notably for reservoir characterization. The data given here are surface seismic data. This method is described for example in the following publication:

Bourgeois, A. et al. (1989) "The Linearized Seismic Inverse Problem: An Attractive Method for a Sharp Description of Strategic Traps": 59$^{th}$ Ann. Intern. Mtg. Soc. Expl. Geoph. Expanded Abstract, pp. 973–976.

Furthermore, it is necessary to have a reference model, consisting (in the context of an acoustic model) of a velocity distribution and of an acoustic impedance distribution: it is the model around which a linearization will be carried out in the waves equation (Born's approximation). In order to simplify the presentation, the 1D case is taken but this hypothesis is all the less essential as the practical applications mainly concern 3D seismic methods. In the 1D context, all of the seismic information is contained in a single shotpoint. Besides, the reference model is also one-dimensional: it only depends on the depth. The unknowns of the problem are the acoustic impedance disturbance and velocity distribution as a function of depth. On the other hand, unlike the first application example, the seismic excitation mode (and notably the seismic wavelet) are assumed to be known. It is an inverse problem made linear by means of linearization.

Surface seismic data are often contaminated by multiple reflections which may have a rather high amplitude. Their kinematics, which is characterized by moveout in the 1D context, is generally quite different from that of primary reflexions: these two types of waves have generally travelled through geologic layers having different propagation velocities. This is the reason why linearized inversion is in itself an efficient technique for attenuating multiple reflections: the kinematics of primary reflections (the events modelled by Born's approximation) is entirely defined by the velocity distribution in the reference model: the modelled events therefore cannot adjust to multiple reflections if the moveout thereof differs from that of the primary reflections. However, because of the stationarities at the zero offset, there is in practice a partial adjustment and the linearized inversion results appear to be contaminated by the presence of the correlated noise consisting of the multiple reflections. The seismic data of FIG. 12A have been modelled by taking account of the multiple reflections (there are only 3 primary reflections which reach the zero offset successively at the times: 500; 1000; 1650 ms, the 2$^{nd}$ arrival having a particularly high amplitude).

In the seismic response of the model obtained after conventional linearized inversion (see FIG. 12B), the high-amplitude multiple arriving at approximately 1500 ms at the zero offset has been only weakly attenuated and the model is contaminated by the multiple. It is then natural to try to use the possibilities afforded by Nemeth's method in order to better discriminate multiples and primaries, notably with the improvements provided by our method.

Hereafter the implementation of the method for 1D linearized inversion of surface seismic data is described.

Experimental Protocol

It specifies:

the seismic excitation mode: in experiments, the seismic source is a source point time-modulated by a function (seismic wavelet) denoted by w(t), the various locations where the receivers are positioned: in experiments, the pickups are arranged at the depth 10 m and cover the offset interval [$x_{min}$=0, $x_{max}$=1500 m], with a receiver every $\Delta x$=100 m; thus obtained are seismic traces numbered from 0 to I, the pickups measure the pressure field resulting from the wave propagation, the recording time:: in experiments, the pickups measure the vibrational state over the time interval [0, T=1800 ms], these data being sampled every $\Delta t$=1 ms. Thus samples are obtained numbered from 0 to N.

The quantity $d_i^n$ us referred to as the data sample recorded for the offset $x_{min}$+i $\Delta x$ and at the time n $\Delta t$. The relationship: T=N $\Delta t$ and $x_{max}$=$x_{min}$+I $\Delta x$ exists.

Acquisition of Data in Accordance with this Experimental Protocol

Experiments were carried out from synthetic data: these data were $$\frac{1}{\sigma c}\frac{\partial^2 P}{\partial t^2} - \nabla \frac{\sigma}{c}\vec{\nabla}P = \delta(x, z-z_S)w(t) \text{ in } \mathcal{R} \times \mathcal{R}^{*+} \times [0, T]$$

obtained by numerical resolution (finite-difference method) of the 2D wave equation:

with the boundary condition:

P(z=0)=0 and the initial conditions:

$$P(t=0) = \frac{\partial P}{\partial t}(t=0) = 0$$

an equation wherein:

x, z, t respectively designate the lateral coordinate, the depth and the time,

σ and c respectively represent the acoustic impedance and propagation velocity distributions (functions of the depth).

Figure 13A:
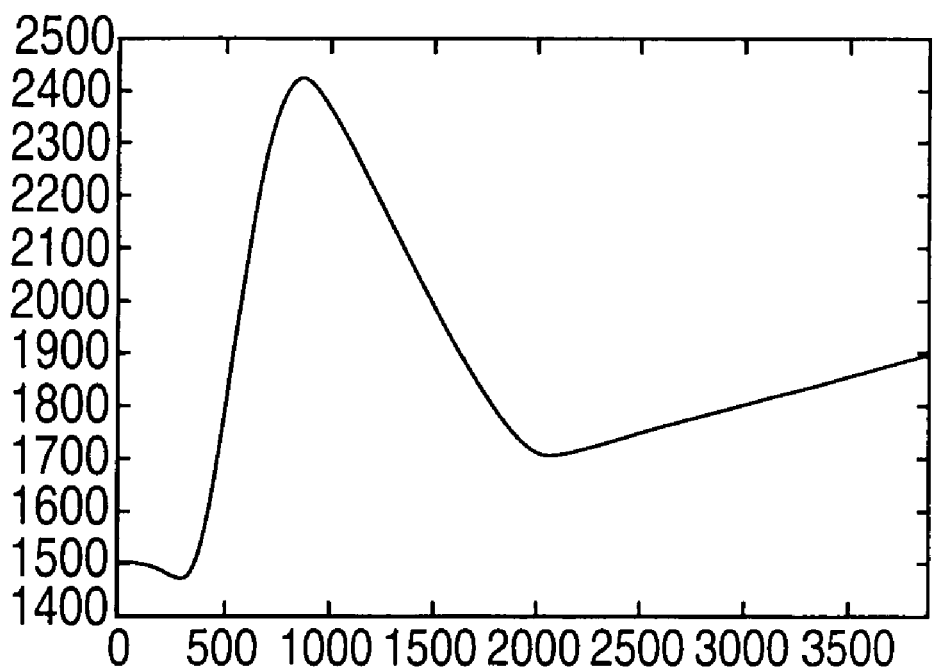
Figure 13B:
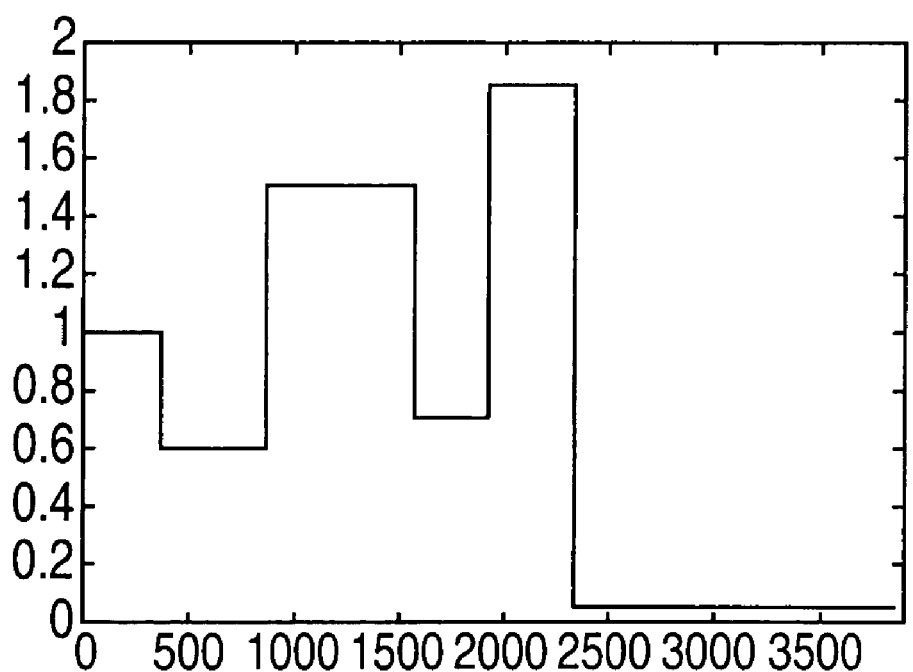

The wavelet selected is a conventional Ricker wavelet of central frequency 30 Hz and the impedance σ and velocity c distributions are given in FIGS. 13A, 13B. The seismic response of this model therefore is the data represented in FIG. 12A. The quantity $F_{NL}$ is referred to as the operator which associates the seismic data with function pair ($\sigma(z)$, c(z)).

Specification of the Modelling Operator

A reference model is selected which is described by function pair ($\sigma_0(z), c_0(z)$). In the experiments presented hereafter, $c_0(z)$=c(z) and $\sigma_0(z)$=cte (=1) have been selected. The Jacobian operator of operator $F_{NL}$ is chosen as the modelling operator at point ($\sigma_0(z), c_0(z)$). In fact, since $c_0(z)$=c(z) has been selected, the only unknown is $\delta\sigma(z)$=σ(z)−$\sigma_0(z)$ and only the corresponding component of the Jacobian is important.

The modelling operator, which is referred to as F(δm), thus is the (linear) operator which associates with function pair δm=(δσ(z),δc(z)) the samples δy($x_i,t^n$) which are the components of vector F (δm) for $x_i$=$x_{min}$+i $\Delta x$ and $t^n$=n $\Delta t$, i=0, . . . , I; n=0, . . . , N.

Specification of the Modelling Operator Associated with each Correlated Noise

The procedure is specified herein that can be used for modelling each correlated noise. Each correlated noise is characterized by correlation directions specific thereto, which are assumed to be known, at least approximately: these correlation directions are specified by means of a field of correlation vectors $\vec{c}_j(x,t)$ of components ($c_j^x(x,t)$, $c_j^t(x, t)$) which has to be defined at any point of the domain [$x_{min}$, $x_{max}$]×[0,T]. In an equivalent way, the correlation directions can be specified by means of correlation lines that represent the field lines associated with $\vec{c}_j(x,t)$. Such correlation lines can be obtained according to the technique described in U.S. Pat. No. 4,972,383 filed by the assignee, from a pick of several phases characteristic of the noise, the information being extended to the whole domain $[x_{min}, x_{max}] \times [0,T]$ by means of conventional interpolation and/or extrapolation procedures, as described in the aforementioned patent. For this second application example wherein elimination of the aforementioned multiple is desired, this multiple is picked (the amplitude peak for example), which enables defining the arrival time variations as a function of the offset and defines a correlation line continuum by simple vertical translation of the chosen line (under these conditions, vector $\vec{c}(x,t)$ does not depend on t). Specification of the correlation directions amounts to specifying the propagation velocity distribution of the noise $c_j(x,t)$ that is related to the correlation vector by the relation $c_j(x,t) = c_j^x(x,t)/c_j^t(x,t)$ Unlike the 1$^{st}$ application example described above, here noise amplitude variations are along the correlation line. The assumption is that these amplitude variations can be estimated from a measurement on the data or by means of theoretical considerations: this measurement defines a function g(x).

The noise will thus be modelled by the composition of two operators:

A transport operator, as in the first application example;

An amplitude modulation, that is the multiplication of the solution to the transport equation by function g(x).

If again the scheme given for the 1$^{st}$ application example is used (and notably if the same hypotheses and notations are used), the following information is introduced:

a space $B_j$ of noise-generating functions which will be the space of support functions $\beta_j(t)$ in $[t_j^{min}, t_j^{max}] \subset [0,T]$ and that we extend by 0 in the whole interval $[0,T]$;

noise modelling operator $T_j$:

$$T_j : \beta_j(t) \in B_j \to b_j(x,t) \in D$$

solution to the transport equation $$\vec{\nabla} b_j(x,t) \cdot \vec{c}_j(x,t) = 0 \text{ in } [x_{min}, x_{max}] \times [0,T]$$

and meeting the initial conditions:

$$\begin{cases} b_j(x, t=0) = 0 \\ b_j(x = x_{min}, t) = \beta_j(t) \end{cases}$$

In fact, the transport equation is solved by means of a numerical scheme. It is for example possible to use the conventional finite-difference centered scheme. Therefore discretization intervals $\Delta x_j'$ and $\Delta t_j'$ are selected (which are not necessarily equal to $\Delta x$ and $\Delta t$, but which are assumed to be submultiples of these quantities, even if more general situations can be considered) and a grid is introduced whose nodes are the points of coordinates $(x_{min} + i' \Delta x_j', n' \Delta t_j')$ with $i'$ and $n' \in \mathbb{N}$. The conventional finite-difference centered scheme explained hereunder allows, from the initial conditions, to calculate step by step the different values taken by function $b_j(x,t)$ at the various nodes of the grid (to simplify the notations, subscript j associated with the correlated noise considered has been omitted).

$$\frac{\xi_{i'} + \frac{1}{2}}{2\Delta t'} [b_{i'+1}^{n'+1} + b_{i'}^{n'+1} - b_{i'+1}^{n'} - b_{i'}^{n'}] + \frac{1}{2\Delta x' \tau^{n'+\frac{1}{2}}} [b_{i'+1}^{n'+1} + b_{i'+1}^{n'} - b_{i'}^{n'+1} - b_{i'}^{n'}] = 0$$

In the above formula, quantity $\alpha_{i'}^{n'}$ represents the evaluation of quantity $\alpha$ ($\alpha$ is a generic term) at the point of coordinates $(x_{min} + i' \Delta x_j', n' \Delta t_j')$.

Here, discretization intervals $\Delta x_j'$ and $\Delta t_j'$ have to be selected sufficiently small in relation to the wavelength because the numerical scheme is desired to give a precise approximation of the function solution to the transport equation (no dispersion is desired).

The last stage of the noise modelling procedure selects the samples $b_{i'}^{n'}$ that belong to the nodes common to the two grids and in multiplying them by $g(i\Delta x)$: the various components of the vector (of the data space) $T_j(\beta_j)$ are obtained.

Specification of a Norm or of a Semi-Norm in the Data Space

A first choice takes as the norm in the data space any discrete norm meant to be an approximation (via a quadrature formula) to the norm defined on a continuous basis by:

$$\|u\|_D = \left( \int_{x_{min}}^{x_{max}} dx \int_0^T dt \frac{1}{\tau(t)} u^2(x,t) \right)^{\frac{1}{2}}$$

The semi-norm can also be used, which is a better choice as discussed below:

$$\|u\|_D = \left( \Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

where u is any vector of the data space (i and n are the indices representing the sample numbers respectively in space and in time).

Besides, other choices are also possible.

Specification, in each Noise-Generating Functions Space, of a Norm for which each Noise Modelling Operator Establishes an Isometric Relation (or the Approximation to an Isometric Relation) between the Noise-Generating Functions Space and the Data Space (Provided with the Semi-Norm or Defined)

Herein the procedure is specified that can be used to define the norm in the noise-generating functions space associated with each correlated noise.

A first choice provides each noise-generating functions space $B_j$ with any discrete norm meant to be an approximation (via a quadrature formula) to the norm defined on a continuous basis by (here again, the subscript j has been omitted to simplify the notations):

$$\|\beta\|_B = \sqrt{\left( \int_{x_{min}}^{x_{max}} dx g^2(x) \right) \left( \int_0^T dt \frac{1}{\tau(t)} \beta^2(t) \right)}$$

in which case, using the fact that $b_j(x,T)=0$ for $x \in [x_{min}, x_{max}]$, linear operator $T_j$ performs an isometry between $B_j$ and $D$. However, since calculation of $T_j\beta_j$ is carried out numerically, the isometric character of operator $T_j$ will not be perfect but only approximate, the approximation being all the better as discretization intervals $\Delta x$, $\Delta t$, $\Delta x_j'$, $\Delta t_j'$ are small. The fact that only approximately an isometry exists will lead to lower performances concerning the algorithmic implementation presented in paragraph 8.

A better choice provides space for each noise-generating function $B_j$ with the semi-norm (here again, the subscript j has been omitted to simplify the notations):

$$\|\beta\|_B = \sqrt{\Delta x \Delta t \left(\sum_{i=0}^{I-1} g^2(i\Delta x)\right)\left(\sum_{n=0}^{N-1} \frac{1}{\tau^{n+\frac{1}{2}}}(\beta^{n+1} + \beta^n)^2\right)}$$

In this case, operator $T_j$ rigorously performs an isometry between $B_j$ and $D$, at least if the solution to the discretization scheme of the transport equation is identically zero for n=N.

Definition of the Cost Function

The cost function is defined by the formula as follows:

$$C(\delta m, \beta_1, \beta_2, \ldots \beta_J) = \left\| F_{NL}(m_0) + F(\delta m) + \sum_{j=1}^{J} T_j\beta_j - d \right\|_D^2$$

It can be noted that, in the above function, $F_{NL}(m_0)$ is a constant vector.

Seeking the Model and the Noise-Generating Functions Minimizing the Cost Function, this Search Being Carried Out by an Algorithmic Method Taking Advantage, Explicitly or Implicitly, of the Isometry Properties of the Noise Modelling Operators The algorithmic method uses the specificity of Schur's complement, a specificity associated with the isometric character of operators $T_j$. This can be done for example by realizing that minimizing $C(\delta m, \beta_1, \beta_2, \ldots, \beta_J)$ amounts to minimizing $$C'(\delta m) = C(\delta m, \tilde{\beta}_1(\delta m), \tilde{\beta}_2(\delta m), \ldots \tilde{\beta}_J(\delta m))$$

where $(\tilde{\beta}_1(\delta m), \tilde{\beta}_2(\delta m), \ldots \tilde{\beta}_J(\delta m))$ minimizes $C(\delta m, \beta_1, \beta_2, \ldots, \beta_J)$ for given $\delta m$. It can be noted that the Hessian associated with this quadratic form is Schur's complement. $C'(\delta m)$ can be minimized by means of any optimization method; cost function $C'(\delta m)$ being quadratic, the use of a conjugate gradient method is here particularly appropriate.

Determination of $(\tilde{\beta}_1(m), \tilde{\beta}_2(m), \ldots \tilde{\beta}_J(m))$ is very easy in view of the isometric character of operators $T_j$, notably if choices (4) and (5) have been respectively selected to define $\| \|_D$ and $\| \|_{B_j}$. If there is only one type of noise (J=1), which is the case for our illustration, and if the isometry is perfect (which is also the case thanks to the choices made), determination of $\tilde{\beta}_1(m)$ simply requires evaluation of the gradient of the quadratic form. If there is a superposition of several noises (J>1), various algorithms can be considered to take advantage of the isometric character of operators $T_j$ as explained for the first application example.

FIG. 14B shows the results obtained (seismic response of the solution model) by implementing the method when function $g(x)$ is selected in a very simple form (affine function). The improvement in relation to the conventional inversion result can be observed (FIG. 14A).

A method of estimating, from data obtained by exploration of a zone of a heterogeneous medium, a model representative of a distribution in the zone, of at least on physical quantity, the model being free of a presence of correlated noises that may be contained in the data is illustrated in FIG. 15. The method begins at starting point 100 and proceeds to point 102 where acquiring measurements giving information about physical characteristics of the zone by following a predetermined experimental protocol occurs. The method proceeds to point 104 where specifying a noise modelling operator which associates, with a model of each physical quantity, synthetic data that constitutes a response of the model, the measurements and the synthetic data belonging to a data space occurs. The model proceeds to point 10 where selecting, for each correlated noise referenced by a subscript j ranging from 1 to j, a noise modelling operator which associates a correlated noise with an noise generating function belonging to a predetermined space of the noise generating functions ($b_j$) occurs. The method proceeds to point when specifying a norm or of a semi-norm on the data space as specified at point 108. The method proceeds to specifying a semi-norm in the space of the norm-generating functions for which noise modelling operator establishes substantially an isometric relation between the space of noise-generating functions and the data space occurs. The method proceeds to point 112 where defining a cost function qualifying a difference between the measurements on one hand and a super position of a model response and of the correlated noise associated with the noise-generating functions occurs. The method proceeds to point 114 where adjustment of the model and of the noise-generating functions by minimizing the cost function, by means of an algorithmic method taking advantage of isometry of properties of the noise generated noise modeling operators occurs.

Implementation examples where the physical parameter whose subsurface distribution is modelled is the acoustic impedance have been described. It is clear that the method, in its most general definition, can be applied for seeking the distribution of physical quantities affected by correlated noises in any heterogeneous medium.

The invention claimed is:

1. A method of estimating, from data obtained by exploration of a zone of a heterogeneous medium, a model representative of a distribution, in the zone, of at least one physical quantity, the model being free of a presence of correlated noises that may be contained in the data, comprising:
   a) acquiring measurements giving information about physical characteristics of the zone by following a predetermined experimental protocol;
   b) specifying a noise modelling operator which associates, with a model of each physical quantity, synthetic data that constitute a response of the model, the measurements and the synthetic data belonging to a data space;
   c) selecting, for each correlated noise referenced by a subscript j ranging from 1 to J, a noise modelling operator which associates a correlated noise with a noise-generating function belonging to a predetermined space of the noise-generating functions ($B_j$);
   d) specifying a norm or of a semi-norm in the data space;
   e) specifying a semi-norm in the space of the noise-generating functions for which each noise modelling operator establishes substantially an isometric relation between the space of noise-generating functions and the data space;

f) defining a cost function quantifying a difference between the measurements on one hand and a superposition of a model response and of the correlated noise associated with the noise-generating function on the other hand; and g) adjusting the model and of the noise-generating functions by minimizing the cost function, by means of an algorithmic method taking advantage of isometry of properties of the noise modelling operators.

2. A method as claimed in claim 1, wherein:
a distribution as a function of depth of an acoustic impedance in the medium is sought, the correlated noises affecting the data are tube waves each identified by parameters characterizing their propagation, the measured data are VSP data obtained by means of pickups which detect displacement of particles in the medium in response to a localized seismic excitation, the location of the pickups and a recording time and time sampling points being defined, and the selected noise modelling operator associates the synthetic data with an acoustic impedance distribution as a function of an evaluated depth in travel time and with vertical stress measured as a function of time at a depth of the first pickup.

3. A method as claimed in claim 2, wherein:
the cost function quantifying the difference is a square of the semi-norm of the difference in the data space.

4. A method as claimed in claim 2, wherein:
adjustment of the model and of the noise-generating functions is obtained by means of a block relaxation method for eliminating unknowns corresponding to each correlated noise generating function, the block relaxation method being implemented within iterations of a quasi-Newtonian algorithm for calculation of the model.

5. A method as claimed in claim 3, wherein:
adjustment of the model and of the noise-generating functions is obtained by means of a block relaxation method for eliminating the unknowns corresponding to each correlated noise generating function, this the block relaxation method being implemented within the iterations of a quasi-Newtonian algorithm for calculation of the model.

6. A method as claimed in claim 2, wherein:
numerical calculation of the image of a model by the modelling operator is carried out by a numerical solution of a 1D wave equation for the model, by selecting values taken by displacement of the particles at locations of pickups and at previously defined time sampling points, and by applying an operator likely to compensate for spherical divergence and attenuation effects.

7. A method as claimed in claim 3, wherein:
numerical calculation of the image of a model by the modelling operator is carried out by a numerical solution of the a 1D waves equation for the model considered, by selecting values taken by the displacement of the particles at the locations of pickups and at the previously defined time sampling points, and by applying an operator likely to compensate for the spherical divergence and attenuation effects.

8. A method as claimed in claim 4, wherein:
numerical calculation of the image of a model by the modelling operator is carried out by a numerical solution of the a 1D waves equation for the model considered, by selecting values taken by the displacement of the particles at the locations of pickups and at the previously defined time sampling points, and by applying an operator likely to compensate for the spherical divergence and attenuation effects.

9. A method as claimed in claim 5, wherein:
numerical calculation of the image of a model by the modelling operator is carried out by a numerical solution of the a 1D waves equation for the model considered, by selecting values taken by the displacement of the particles at the locations of pickups and at the previously defined time sampling points, and by applying an operator likely to compensate for the spherical divergence and attenuation effects.

10. A method as claimed in claim 2, wherein:
the noise modelling operator is a finite-difference centered numerical scheme for discretizing a noise transport equation, and a utilized noise generating function has an initial condition along an edge of an observation zone belonging to the space ($B_j$): of support time functions in a give time interval.

11. A method as claimed in claim 3, wherein:
the noise modelling operator is a finite-difference centered numerical scheme for discretizing the noise transport equation, and the utilized noise-generating function involved as the function has an initial condition along the an edge of the an observation zone belongs belonging to a the space ($B_j$) consisting of the support time functions in a give time interval.

12. A method as claimed in claim 4, wherein:
the noise modelling operator is a finite-difference centered numerical scheme for discretizing the noise transport equation, and the utilized noise-generating function involved as the function has an initial condition along the an edge of the an observation zone belongs belonging to a the space ($B_j$) consisting of the support time functions in a give time interval.

13. A method as claimed in claim 5, wherein:
the noise modelling operator is a finite-difference centered numerical scheme for discretizing the noise transport equation, and the utilized noise-generating function involved as the function has an initial condition along the an edge of the an observation zone belongs belonging to a the space ($B_j$) consisting of the support time functions in a give time interval.

14. A method as claimed in claim 6, wherein:
the noise modelling operator is a finite-difference centered numerical scheme for discretizing the noise transport equation, and the utilized noise-generating function involved as the function has an initial condition along the an edge of the an observation zone belongs belonging to a the space ($B_j$) consisting of the support time functions in a give time interval.

15. A method as claimed in claim 7, wherein:
the noise modelling operator is a finite-difference centered numerical scheme for discretizing the noise transport equation, and the utilized noise-generating function involved as the function has an initial condition along the an edge of the an observation zone belongs belonging to a the space ($B_j$) consisting of the support time functions in a give time interval.

16. A method as claimed in claim 8, wherein:
the noise modelling operator is a finite-difference centered numerical scheme for discretizing the noise transport equation, and the utilized noise-generating function involved as the function has an initial condition along the an edge of the an observation zone belongs belonging to a the space ($B_j$) consisting of the support time functions in a give time interval.

17. A method as claimed in claim 9, wherein:

the noise modelling operator is a finite-difference centered numerical scheme for discretizing the noise transport equation, and the utilized noise-generating function involved as the function has an initial condition along the an edge of the an observation zone belongs belonging to a the space ($B_j$) consisting of the support time functions in a give time interval.

18. A method as claimed in claim 2, wherein:

a semi-norm selected for the data space is:

$$\|u\|_D = \left( \Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and a semi-norm selected for the space of the noise-generating function is:

$$\|\beta\|_B = \left( \Delta x \Delta t \, I \sum_{n=0}^{N-1} \frac{1}{\tau^{n+\frac{1}{2}}} (\beta^{n+1} + \beta^n)^2 \right)^{\frac{1}{2}}.$$

19. A method as claimed in claim 3, wherein:

the a semi-norm selected for the data space is:

$$\|u\|_D = \left( \Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating function space is:

$$\|\beta\|_B = \left( \Delta x \Delta t \, I \sum_{n=0}^{N-1} \frac{1}{\tau^{n+\frac{1}{2}}} (\beta^{n+1} + \beta^n)^2 \right)^{\frac{1}{2}}.$$

20. A method as claimed in claim 4, wherein:

the a semi-norm selected for the data space is:

$$\|u\|_D = \left( \Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating function is:

$$\|\beta\|_B = \left( \Delta x \Delta t \, I \sum_{n=0}^{N-1} \frac{1}{\tau^{n+\frac{1}{2}}} (\beta^{n+1} + \beta^n)^2 \right)^{\frac{1}{2}}.$$

21. A method as claimed in claim 5, wherein:

the a semi-norm selected for the data space is:

$$\|u\|_D = \left( \Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating function space is:

$$\|\beta\|_B = \left( \Delta x \Delta t \, I \sum_{n=0}^{N-1} \frac{1}{\tau^{n+\frac{1}{2}}} (\beta^{n+1} + \beta^n)^2 \right)^{\frac{1}{2}}.$$

22. A method as claimed in claim 6, wherein:

the a semi-norm selected for the data space is:

$$\|u\|_D = \left( \Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating function space is:

$$\|\beta\|_B = \left( \Delta x \Delta t \, I \sum_{n=0}^{N-1} \frac{1}{\tau^{n+\frac{1}{2}}} (\beta^{n+1} + \beta^n)^2 \right)^{\frac{1}{2}}.$$

23. A method as claimed in claim 7, wherein:

the a semi-norm selected for the data space is:

$$\|u\|_D = \left( \Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating function is:

$$\|\beta\|_B = \left( \Delta x \Delta t \, I \sum_{n=0}^{N-1} \frac{1}{\tau^{n+\frac{1}{2}}} (\beta^{n+1} + \beta^n)^2 \right)^{\frac{1}{2}}.$$

24. A method as claimed in claim 8, wherein:

the a semi-norm selected for the data space is:

$$\|u\|_D = \left( \Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating function space is:

$$\|\beta\|_B = \left(\Delta x \Delta t I \sum_{n=0}^{N-1} \frac{1}{\tau^{n+\frac{1}{2}}} (\beta^{n+1} + \beta^n)^2 \right)^{\frac{1}{2}}.$$

25. A method as claimed in claim 9, wherein:
the a semi-norm selected for the data space is:

$$\|u\|_D = \left(\Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating function space is:

$$\|\beta\|_B = \left(\Delta x \Delta t I \sum_{n=0}^{N-1} \frac{1}{\tau^{n+\frac{1}{2}}} (\beta^{n+1} + \beta^n)^2 \right)^{\frac{1}{2}}.$$

26. A method as claimed in claim 10, wherein:
the a semi-norm selected for the data space is:

$$\|u\|_D = \left(\Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating function space is:

$$\|\beta\|_B = \left(\Delta x \Delta t I \sum_{n=0}^{N-1} \frac{1}{\tau^{n+\frac{1}{2}}} (\beta^{n+1} + \beta^n)^2 \right)^{\frac{1}{2}}.$$

27. A method as claimed in claim 11, wherein:
the a semi-norm selected for the data space is:

$$\|u\|_D = \left(\Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating function space is:

$$\|\beta\|_B = \left(\Delta x \Delta t I \sum_{n=0}^{N-1} \frac{1}{\tau^{n+\frac{1}{2}}} (\beta^{n+1} + \beta^n)^2 \right)^{\frac{1}{2}}.$$

28. A method as claimed in claim 12, wherein:
the a semi-norm selected for the data space is:

$$\|u\|_D = \left(\Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating function space is:

$$\|\beta\|_B = \left(\Delta x \Delta t I \sum_{n=0}^{N-1} \frac{1}{\tau^{n+\frac{1}{2}}} (\beta^{n+1} + \beta^n)^2 \right)^{\frac{1}{2}}.$$

29. A method as claimed in claim 13, wherein:
the a semi-norm selected for the data space is:

$$\|u\|_D = \left(\Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating functions space is:

$$\|\beta\|_B = \left(\Delta x \Delta t I \sum_{n=0}^{N-1} \frac{1}{\tau^{n+\frac{1}{2}}} (\beta^{n+1} + \beta^n)^2 \right)^{\frac{1}{2}}.$$

30. A method as claimed in claim 14, wherein:
the a semi-norm selected for the data space is:

$$\|u\|_D = \left(\Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating function space is:

$$\|\beta\|_B = \left(\Delta x \Delta t I \sum_{n=0}^{N-1} \frac{1}{\tau^{n+\frac{1}{2}}} (\beta^{n+1} + \beta^n)^2 \right)^{\frac{1}{2}}.$$

31. A method as claimed in claim 15, wherein:
the a semi-norm selected for the data space is:

$$\|u\|_D = \left(\Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating function space is:

$$\|\beta\|_B = \left(\Delta x \Delta t \, l \sum_{n=0}^{N-1} \frac{1}{\tau^{n+\frac{1}{2}}} (\beta^{n+1} + \beta^n)^2 \right)^{\frac{1}{2}}.$$

32. A method as claimed in claim 16, wherein:
the a semi-norm selected for the data space is:

$$\|u\|_D = \left(\Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating function space is:

$$\|\beta\|_B = \left(\Delta x \Delta t \, l \sum_{n=0}^{N-1} \frac{1}{\tau^{n+\frac{1}{2}}} (\beta^{n+1} + \beta^n)^2 \right)^{\frac{1}{2}}.$$

33. A method as claimed in claim 17, wherein:
the a semi-norm selected for the data space is:

$$\|u\|_D = \left(\Delta x \Delta t \sum_{i=0}^{I-1} \sum_{n=0}^{N-1} \frac{1}{\tau^{n+\frac{1}{2}}} (u_i^{n+1} + u_i^n)^2 \right)^{\frac{1}{2}}$$

and the a semi-norm selected for the space of the noise-generating function space is:

$$\|\beta\|_B = \left(\Delta x \Delta t \, l \sum_{n=0}^{N-1} \frac{1}{\tau^{n+\frac{1}{2}}} (\beta^{n+1} + \beta^n)^2 \right)^{\frac{1}{2}}.$$

34. A method as claimed in claim 1, wherein:
a distribution of disturbances, in relation to a previously selected reference model, of an impedance and of a velocity in the zone of the medium is sought, the correlated noises affecting the data are due to multiple reflections whose kinematics and amplitude variations with an offset have been previously estimated, the measured data are picked up by seismic surface pick-ups, the location of the pickups, a seismic excitation mode, a recording time and time sampling points being defined, and the modelling operator being defined by linearization of the waves equation around the model representative of the distribution.

35. A method as claimed in claim 34, wherein:
the cost function quantifying the difference is the square of the semi-norm of the difference in the data space.

36. A method as claimed in claim 34, wherein:
adjustment of the model and of the noise-generating functions is obtained by a block relaxation method for eliminating unknowns corresponding to each correlated noise generating function, the relaxation method being implemented within iterations of a conjugate gradient algorithm for calculation of the model.

37. A method as claimed in claim 35, wherein:
adjustment of the model and of the noise-generating functions is obtained by means of a block relaxation method for eliminating the unknowns corresponding to each correlated noise generating function, this the relaxation method being implemented within the iterations of a conjugate gradient algorithm for calculation of the model.

* * * * *